United States Patent
Walling et al.

(10) Patent No.: US 10,992,455 B2
(45) Date of Patent: Apr. 27, 2021

(54) CONSENSUS BASED AD-HOC GROUP CREATION

(71) Applicant: International Business Machines Corporation, Armonk, NY (US)

(72) Inventors: Collin Walling, Poughkeepsie, NY (US); Trent Balta, Poughkeepsie, NY (US); Luis Angel D. Bathen, Placentia, CA (US); Colette Manoni, Brewster, NY (US); Marc H. Coq, Poughkeepsie, NY (US); Eugene E. Nitka, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 16/103,631

(22) Filed: Aug. 14, 2018

(65) Prior Publication Data

US 2020/0059352 A1 Feb. 20, 2020

(51) Int. Cl.
*H04L 9/06* (2006.01)
*G06F 21/60* (2013.01)

(52) U.S. Cl.
CPC .......... *H04L 9/0637* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 9,646,029 B1 | 5/2017 | Baird | |
| 10,423,961 B1* | 9/2019 | El Defrawy | G06Q 20/3829 |
| 10,681,133 B2* | 6/2020 | Puleston | G06F 16/907 |
| 2007/0074019 A1 | 3/2007 | Seidel | |
| 2012/0260087 A1 | 10/2012 | McGough | |
| 2015/0244690 A1 | 8/2015 | Mossbarger | |
| 2016/0335533 A1 | 11/2016 | Davis et al. | |

(Continued)

FOREIGN PATENT DOCUMENTS

WO 2017139688 A1 8/2017

OTHER PUBLICATIONS

Stefan Thomas & Evan Schwartz, A Protocol for Interledger Payments, https://interledger.org/interledger.pdf, See Section 3.5.2.

(Continued)

*Primary Examiner* — Benjamin E Lanier

(57) ABSTRACT

An example operation may include one or more of: creating a document that defines procedures to create an ad-hoc group having an original peer, to add a new peer to the ad-hoc group and to remove of one or more of the original peer and the new peer; maintaining, via a memory, a cryptographic distributed ledger based on the document and peer data associated with the ad-hoc group; encrypting the document; encrypting the cryptographic distributed ledger; providing the encrypted cryptographic distributed ledger to the ad-hoc group; decrypting the encrypted document; modifying the document; decrypting the encrypted cryptographic distributed ledger; updating the cryptographic distributed ledger; encrypting the modified document to create an encrypted modified document; encrypting the updated cryptographic distributed ledger; and providing the updated encrypted cryptographic distributed ledger to the ad-hoc group.

12 Claims, 14 Drawing Sheets

(56) References Cited

U.S. PATENT DOCUMENTS

| | | |
|---|---|---|
| 2017/0048216 A1* | 2/2017 | Chow .................... H04L 63/061 |
| 2017/0048217 A1 | 2/2017 | Biggs et al. |
| 2017/0212781 A1 | 7/2017 | Dillenberger et al. |
| 2018/0205546 A1* | 7/2018 | Hague; Farid ........ H04L 9/3247 |
| 2018/0268386 A1* | 9/2018 | Wack .................... H04L 9/3239 |
| 2018/0268506 A1* | 9/2018 | Wodetzki ............ G06K 9/00456 |
| 2019/0068360 A1* | 2/2019 | Bhattacharya ........ H04L 9/3297 |
| 2019/0087598 A1* | 3/2019 | Adkins ................. G06F 21/121 |
| 2019/0165949 A1* | 5/2019 | Ramos .................. G06F 21/645 |
| 2019/0342084 A1* | 11/2019 | Mehedy ................ H04L 9/0825 |
| 2019/0354943 A1* | 11/2019 | Mulye ................ H04N 21/2407 |
| 2019/0392159 A1* | 12/2019 | Wojcik .................... G06F 21/62 |

OTHER PUBLICATIONS

Loomio, Better Decisions Together, Initial Release 2013, Platform Web, https://www.loomio.org/.

* cited by examiner

CONSENSUS BASED AD-HOC GROUP CREATION

TECHNICAL FIELD

This application generally relates to ad-hoc group creation, and more particularly, to a vote-based consensus for ad-hoc group creation using blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Conventionally, when a group of people would like to create a virtual work group, that is, an electronic space to securely transfer, share and manage data, the security of the virtual work group is managed by a third party certificate authority. As such, the members of the group have no authority or management over the security of the group. What is needed is a system and method for a group to be created and managed in an electronic space such that members of the group have direct control over who is part of the group, what are their security credentials, what are their roles and what they are authorized to access.

SUMMARY

One example embodiment may provide a method that includes one or more of creating, via an input/output interface, a document that defines procedures to create an ad-hoc group having an original peer, to add a new peer to the ad-hoc group and to remove of one or more of the original peer and the new peer; maintaining, via a memory, a cryptographic distributed ledger based on the document and peer data associated with the ad-hoc group; encrypting, via a processing unit, the document to create an encrypted document; encrypting, via the processing unit, the cryptographic distributed ledger to create an encrypted cryptographic distributed ledger; providing, via the input/output interface, the encrypted cryptographic distributed ledger to the ad-hoc group; decrypting, via the processing unit, the encrypted document to generate the document; modifying, via the processing unit, the document to create a modified document; decrypting, via the processing unit, the encrypted cryptographic distributed ledger to generate the cryptographic distributed ledger; updating, via the memory, the cryptographic distributed ledger based on the modified document to create an updated cryptographic distributed ledger; encrypting, via the processing unit, the modified document to create an encrypted modified document; encrypting, via the processing unit, the updated cryptographic distributed ledger to create an encrypted updated cryptographic distributed ledger; and providing, via the input/output interface, the updated encrypted cryptographic distributed ledger to the ad-hoc group.

Another example embodiment may provide a system that includes a processor and memory, wherein the processor is configured to perform one or more of creating, via an input/output interface, a document that defines procedures to create an ad-hoc group having an original peer, to add a new peer to the ad-hoc group and to remove of one or more of the original peer and the new peer; maintaining, via a memory, a cryptographic distributed ledger based on the document and peer data associated with the ad-hoc group; encrypting, via a processing unit, the document to create an encrypted document; encrypting, via the processing unit, the cryptographic distributed ledger to create an encrypted cryptographic distributed ledger; providing, via the input/output interface, the encrypted cryptographic distributed ledger to the ad-hoc group; decrypting, via the processing unit, the encrypted document to generate the document; modifying, via the processing unit, the document to create a modified document; decrypting, via the processing unit, the encrypted cryptographic distributed ledger to generate the cryptographic distributed ledger; updating, via the memory, the cryptographic distributed ledger based on the modified document to create an updated cryptographic distributed ledger; encrypting, via the processing unit, the modified document to create an encrypted modified document; encrypting, via the processing unit, the updated cryptographic distributed ledger to create an encrypted updated cryptographic distributed ledger; and providing, via the input/output interface, the updated encrypted cryptographic distributed ledger to the ad-hoc group.

Another example embodiment may provide a system that includes: an input/output interface operable to create a document that defines procedures to create an ad-hoc group having an original peer, to add a new peer to the ad-hoc group and to remove of one or more of the original peer and the new peer; a memory operable to maintain a cryptographic distributed ledger based on the document and peer data associated with the ad-hoc group; and a processing unit operable to encrypt the document to create an encrypted document, to encrypt the cryptographic distributed ledger to create an encrypted cryptographic distributed ledger, wherein the input/output interface is further operable to provide the encrypted cryptographic distributed ledger to the ad-hoc group; wherein the processing unit is further operable to decrypt the encrypted document to generate the document, to modify the document to create a modified document and to decrypt the encrypted cryptographic distributed ledger to generate the cryptographic distributed ledger, wherein the memory is further operable to update the cryptographic distributed ledger based on the modified document to create an updated cryptographic distributed ledger, wherein the processing unit is further operable to encrypt the modified document to create an encrypted modified document and to encrypt the updated cryptographic distributed ledger to create an encrypted updated cryptographic distributed ledger, and wherein the input/output interface is further operable to provide the updated encrypted cryptographic distributed ledger to the ad-hoc group.

DETAILED DESCRIPTION

Figure 1A:
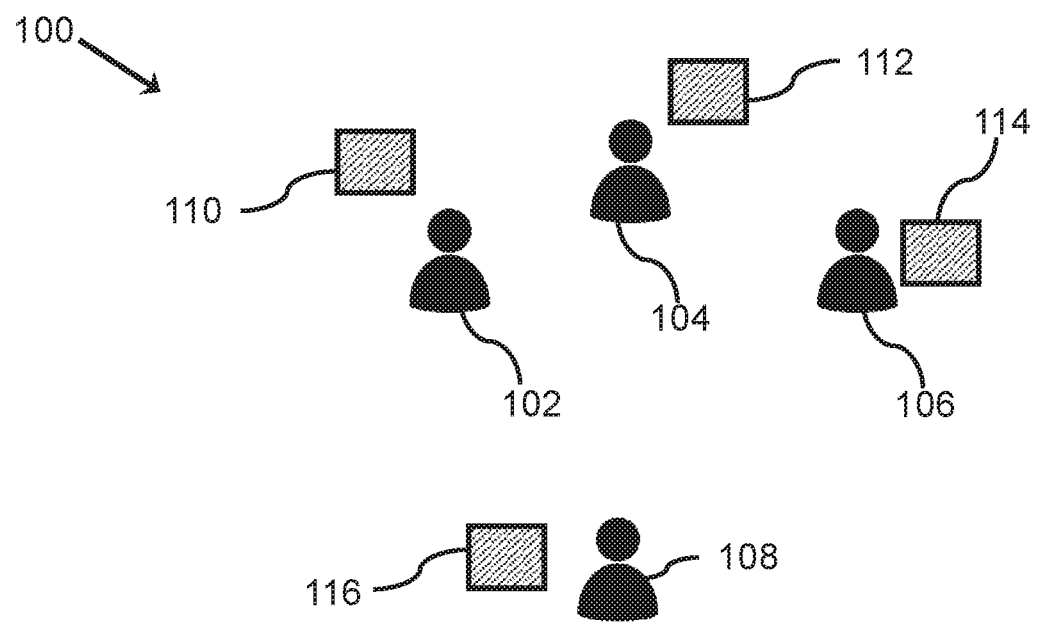
FIG. 1A illustrates ad-hoc group at a time t1.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide a vote-based consensus for ad-hoc group creation using blockchain. As used herein, an "ad-hoc group" is a group of peers that are created and managed via an ad-hoc group document that is supported on a blockchain fabric in accordance with aspects of the present invention. Because of the secure property inherent in a blockchain fabric, as will be described in greater detail below, an ad-hoc group is a trusted group, wherein the credentials of all members of the group have been verified and are maintained by the ad-hoc group document that is supported on the blockchain fabric.

A basis of a system and method for creating and managing an ad-hoc group in accordance with aspects of the present invention is to take advantage of the blockchain fabric in order to create a JSON document to track peers of an ad-hoc group. Voting procedures to add and remove peers are defined, while other communication is handled by the blockchain fabric. The votes are validated via digital signatures, as public keys are exchanged among the group peers during the peer addition process in order to facilitate these signatures. This bypasses the need to validate prospective peers against a third party such as a Certificate Authority.

An ad-hoc group in accordance with aspects of the present invention would be used within a blockchain fabric, non-limiting examples of which include the Hyperledger Fabric or the Bitcoin blockchain. In an example embodiment, a JSON document would act as a "view" of the transaction log in the blockchain fabric. This document holds information on group peers, their associated device for interacting with the blockchain, and their public key specific to this blockchain.

A concept of policies is related to how many votes are needed for a specific action to take place in the group. Example actions supported by a JSON document may include: add a peer to the group (AddPolicy), remove a peer from the group (RemovePolicy), replace a peer's information (Replace policy), allow a peer to leave the group (LeavePolicy).

Briefly, the add policy allows a current peer to propose that a new peer be allowed into the group and must be a unanimous decision. The remove policy allows the group peers to "vote out" a peer of the group with a unanimous decision except for the vote of the peer being voted out. Possible reasons for removing a peer might include a peer no longer aligning with the values/mission of the group, or a peer's device that they use to access the group being lost or stolen i.e. a "rogue" device. The replace policy would be used to essentially update a group peer's information, namely, their associated device. The main use case for this policy is if a peer loses their associated device and needs to associate a new one they could contact the rest of the group externally so that a vote could be cast to replace their information. The policy for this vote would be "m/n" where "m" is a majority vote. The leave policy allows a peer to leave the group and is essentially the same as the remove policy except that only the peer leaving has to vote.

There are many ways to maintain and append a document to a blockchain. In one non-limiting example embodiment, Satoshi-like blockchains are targeted, wherein the initial document is embedded on the blockchain as encoded payload (e.g., JSON to a byte stream) much like how bitcoin transactions are encoded in the Bitcoin blockchain. Each time a group peer is added, a new transaction is invoked, where the transaction parameters show which peer was added, as well as the signatures associated with the votes, and a pointer/reference to the original document. This is done by keeping track of the transaction id (txid) of the original JSON document. Alternatively, we could have an embodiment consisting of a blockchain that keeps a world state such as Etherium or the Hyperledger Fabric.

In an example embodiment a first peer will create the baseline JSON document and it will send the uuid (unique ID) of the document to a second peer, who will then load the document, sign it, and store it back into the blockchain. Adding a peer signature to a document is equivalent to adding a vote as peers vote with their signatures.

The key different between the two embodiments discussed above is that for the first implementation, the software peer connecting to the blockchain needs to be a bit smarter as it will need to crawl the blockchain in order to reconstruct the latest JSON document view, whereas for the latter, all the peer would need to do is do a simple get from the world state in order to retrieve the latest document.

Most forms of authentication today rely on a trusted third party to validate users in order to decide who can/cannot join a permissioned group. However, the rules of who can join or leave the group should be a group-based decision. A system and method in accordance with aspects of the present invention provides a vote-based consensus mechanism to allow for ad-hoc group creation using blockchain.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain peers and only endorsed transactions may be committed to the blockchain and have an effect on the state of the blockchain. Other transactions, which are not endorsed, are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node, which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction, which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is a transaction log, which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The example embodiments are directed to methods, devices, networks and/or systems, which support a blockchain system that solves a technical problem by incorporating off-chain ad-hoc group creation into a customizable secure smart contract, whereas previously provided customizable secure contracts require a third party certificate authority to provide and manage security credentials for all peers of the created ad-hoc group.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, a system and method for creating and managing an ad-hoc group in accordance with aspects of the present invention solves a technical problem by incorporating off-chain ad-hoc group creation into a customizable secure smart contract, whereas previously provided customizable secure contracts require a third party certificate authority to provide and manage security credentials for all peers of the created ad-hoc group. In particular, a system and method for creating and managing an ad-hoc group in accordance with aspects of the present invention draws on some fundamental concepts of blockchain to implement the technical solution to the technical problem. These fundamental concepts include having immutability/accountability, being a smart contract, having security, having privacy, being distributed.

With respect to having immutability, all the votes of all the peers for every vote are recorded. Whether or not new peers can be added, or a peers can be removed is recorded. As a result, a system and method for creating and managing an ad-hoc group in accordance with aspects of the present invention provides a recorded history of accountability of the votes. Once a vote written in the history, the history cannot be changed. There may be changes recorded with respect to votes, but all changes are recorded, so the history cannot be changed.

With respect to accountability, because the history cannot be changed in a system and method for creating and managing an ad-hoc group in accordance with aspects of the present invention, there is a record of all votes. As such, a peer cannot question, for example, "who voted to let person X into the group?"

With respect to being a smart contract, the terms/conditions/policies that define the ad-hoc group creation, and the group itself, changes. In this case, the smart contract provides conditions as to how a peer may be added to a group, how a peer may be removed from a group, how a peer may be invited to join a group, etc. In one non-limiting example embodiment, one condition for adding a peer to the group would be a $\frac{2}{3}^{rd}$ confirmed vote of acceptance from all peers of the group. In another non-limiting example embodiment, one condition for removing a peer from the group would be 1 vote if that peer is voting himself from the group. In another non-limiting example embodiment, one condition for removing a peer from the group would be n−1, confirmed votes to remove, wherein n is the total number of peers in the group.

With respect to security, the blockchain fabric itself provides security with the use of public and private security keys via a public key encryption (PKI) platform. More importantly, this security is managed by peers of the group, within the blockchain platform, without a third party certificate authority.

With respect to privacy, only the peers of the ad-hoc group will have access to data of the ad-hoc group. Further, in some embodiments, the smart contract may provide roles or permission that define which peers have reading access to particular parts of the ad-hoc group and which peers writing access to particular parts of the ad-hoc group. In this manner, some data may be hidden from some peers of the group, whereas other peers of the group may be privy to the data that is hidden from the some peers of the group.

Because of the blockchain, the ledger is distributed. In some embodiments, each peer has a copy of the ledger and is updated accordingly. In some embodiments, each peer has access to a single, common ledger.

One of the benefits of the example embodiments is that it improves the functionality of a computing system by improving security without the need of a third party. In particular, would not be possible for the present invention to be implemented on a traditional database instead of a blockchain because of the present invention does not include a third party certificate authority.

The example embodiments provide numerous benefits over a traditional database. For example, through the blockchain the embodiments provide a system and method for creating and managing an ad-hoc group to solve a technical problem by incorporating off-chain ad-hoc group creation into a customizable secure smart contract, whereas previously provided customizable secure contracts require a third party certificate authority to provide and manage security credentials for all peers of the created ad-hoc group.

Meanwhile, a traditional database could not be used to implement the example embodiments because a system and method for creating and managing an ad-hoc group in accordance with aspects of the present invention provides a functional improvement over prior art systems because the system and method for creating and managing an ad-hoc group in accordance with aspects of the present invention does not include a third party certificate authority and thus provides improved security that is managed by the peers of the ad-hoc group.

Accordingly, the example embodiments provide for a specific solution to a problem in the arts/field of ad-hoc groups.

FIGS. 1A-E illustrate an example ad-hoc group 100 and modifications to ad-hoc group 100 in accordance with aspects of the present invention.

FIG. 1A illustrates ad-hoc group 100 at a time t1. As shown in the figure, ad-hoc group 100 includes peers 102, 104, 106 and 108, which each have access to respective cryptographic distributed ledgers 110, 112, 114 and 116. It should be noted that in some example embodiments, a single cryptographic ledger is provided wherein each of peers 102, 104, 106 and 108 have access to the single cryptographic ledger. More generally speaking therefore, at a cryptographic ledger is provided to each of peers 102, 104, 106 and 108.

Ad-hoc group 100 has been created through a document that defines procedures to create an ad-hoc group, wherein the great has at least one an original peer. The document may additionally define procedures to add new peers to the ad-hoc group. The document may additionally define procedures to remove a peer from the ad-hoc group. Further, this document is provided through a blockchain fabric.

In an example embodiment, the document defines procedures to remove a peer of the ad-hoc group through voting policies. This will be described with reference to FIGS. 1B-C.

Figure 1B:
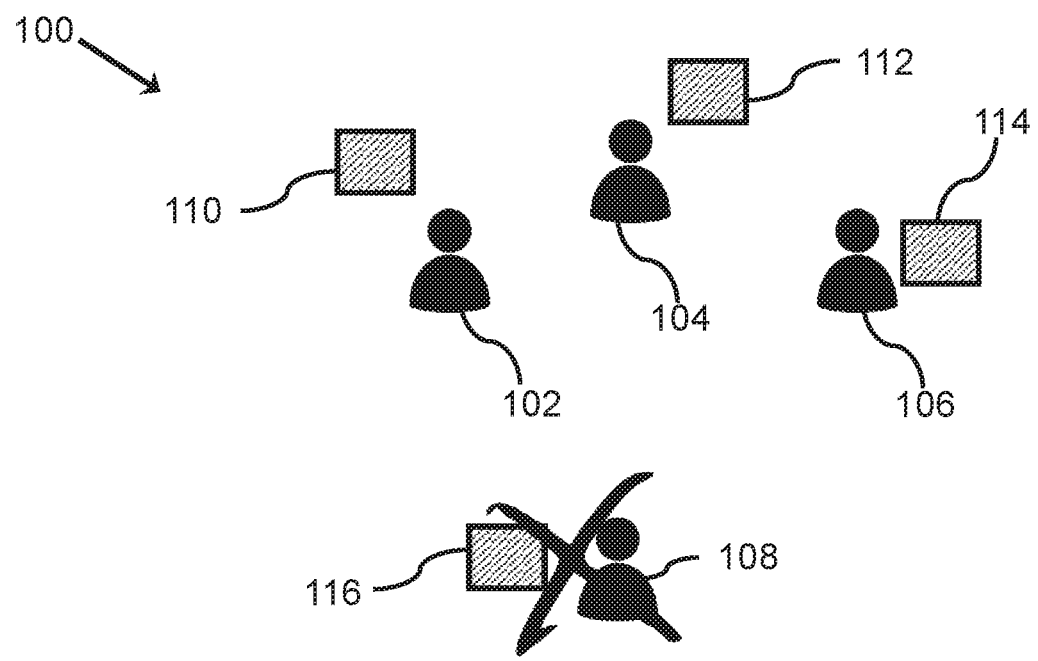
FIG. 1B illustrates the ad-hoc group of FIG. 1A at a time t2.

FIG. 1B illustrates ad-hoc group 100 at a time t2. As shown in the figure, peer 108 is removed from ad-hoc group 100. In some example embodiments, the document may define procedures to remove a peer such that if a peer wants to remove himself, a single vote by the peer removing himself from the group is sufficient. In this example, peer 108 has voted to remove himself from ad-hoc group 110. In some example embodiments, the document may define procedures such that a confirming vote by all other peers is required to remove the peer from the group is sufficient. In such a case, for example, peers 102, 104 and 106 must provide confirmed votes to remove peer 108 from ad-hoc group 110.

Figure 1C:
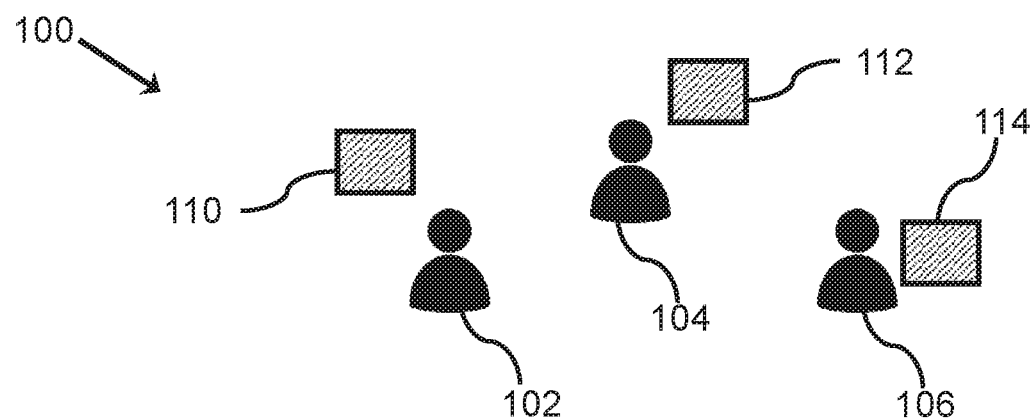
FIG. 1C illustrates the ad-hoc group 100 of FIG. 1B with a peer being removed.

Either by voting himself out with a single vote, or by all votes from other peers, peer 108 would be removed from ad-hoc group 100 as shown in FIG. 1C. It should be noted that once removed from ad-hoc group 110, peer 108 no longer has access to data of the cryptographic ledger.

In another example embodiment, the document defines procedures to add a peer of the ad-hoc group through voting policies. This will be described with reference to FIGS. 1D-E.

Figure 1D:
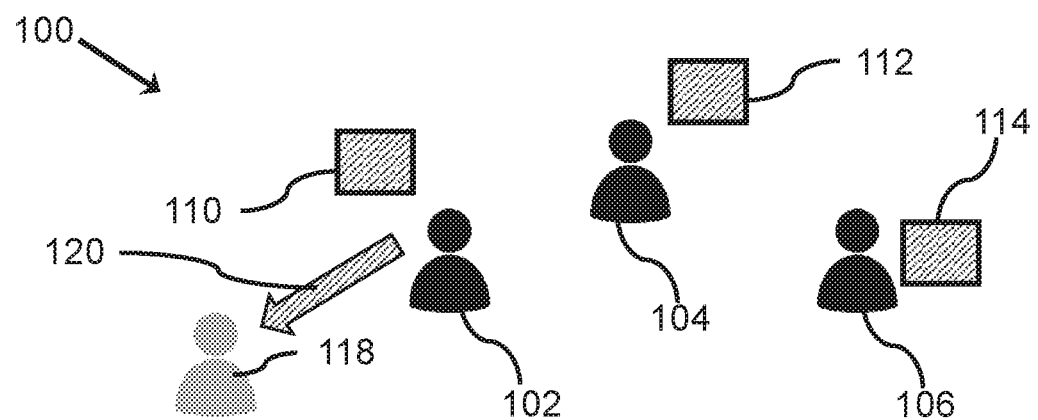
FIG. 1D illustrates ad-hoc group 100 at a time t3.

FIG. 1D illustrates ad-hoc group 100 at a time t3. As shown in the figure, the document may define procedures for peer 102 invite a peer 118 to ad-hoc group 100. As will be described in greater detail below, peer 118 and peer 102 will exchange keys for the formal invitation. After being invited, the document may define procedures such that a confirming vote other peers is required to permit peer 118 to join ad-hoc group 100. In a non-limiting example embodiment, a majority confirming vote is required to permit peer 118 to join ad-hoc group 100.

Figure 1E:
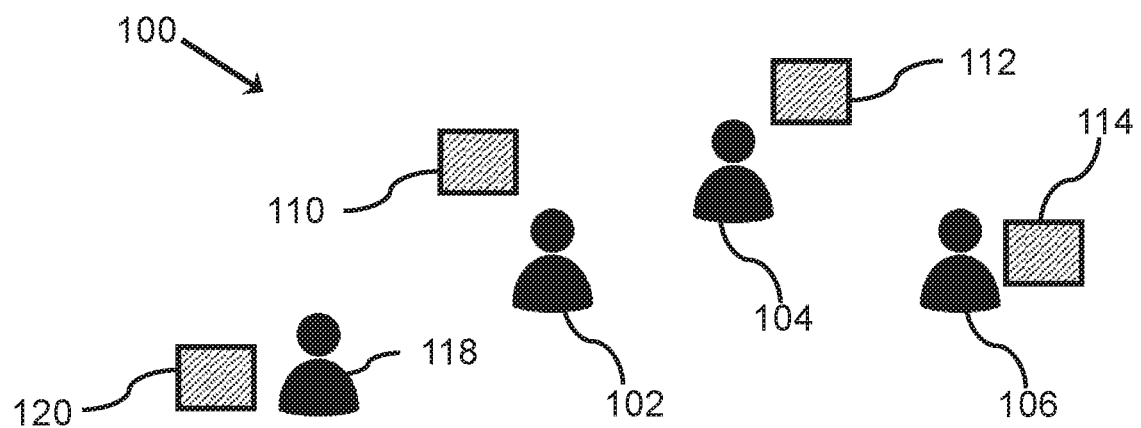
FIG. 1E illustrates ad-hoc group of FIG. 1D with a new peer being added.

If confirmed by the voting scheme defined in the document, peer 118 would be added to ad-hoc group 100 as shown in FIG. 1E. It should be noted that once added to ad-hoc group 100, peer 118 has access to data of the cryptographic ledger, as indicated by cryptographic distributed ledger 120.

A blockchain fabric, for which a document is shared with ad-hoc group 100 in accordance with aspects of the present invention will now be described in greater detail.

Figure 2A:
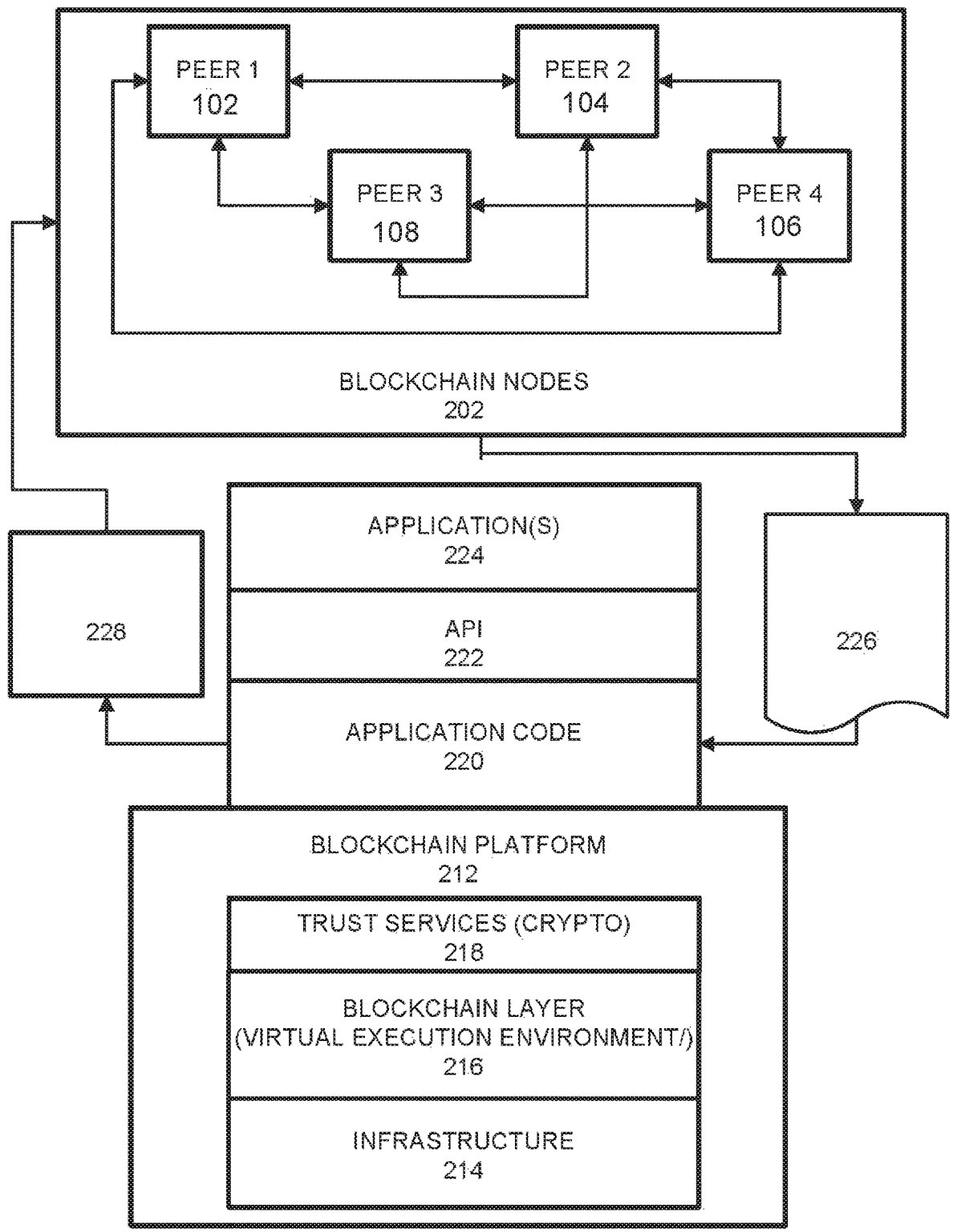
FIG. 2A illustrates an example peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 102-108 (4 nodes are depicted by example only). In this example embodiment, nodes 102-108 correspond to peers 102, 104, 106 and 108 of FIG. 1A, respectively. These nodes participate in a number of activities, such as blockchain transaction addition and validation process (consensus). One or more of the blockchain nodes 102-108 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 102-108.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 102-108 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, encrypted JSON document 226 may be processed by one or more processing entities (e.g., virtual machines) included in the blockchain layer 216. The encrypted updated JSON document 228 may include any changes provided by any peers. Non-limiting examples of such changes includes, votes to add peers, votes to remove peers, changes to peer information and views of peer information. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, an encrypted JSON document 226 may include any information to be securely shared with peers of the ad-hoc group. More importantly, the encrypted JSON document 226 further includes policies for adding trusted peers and removing peers. Still further, the history of encrypted JSON document 226 is tamper prop as a result of the blockchain platform 212. In this manner, all votes, data views and data changes remain in the JSON document 226 for all peers of the group.

It should be noted that in some embodiments, roles may be assigned to peers within the ad-hoc group, as defined in the JSON document 226. Such roles may include permissions to view and/or edit predetermined portions of data within the JSON document.

Figure 2B:
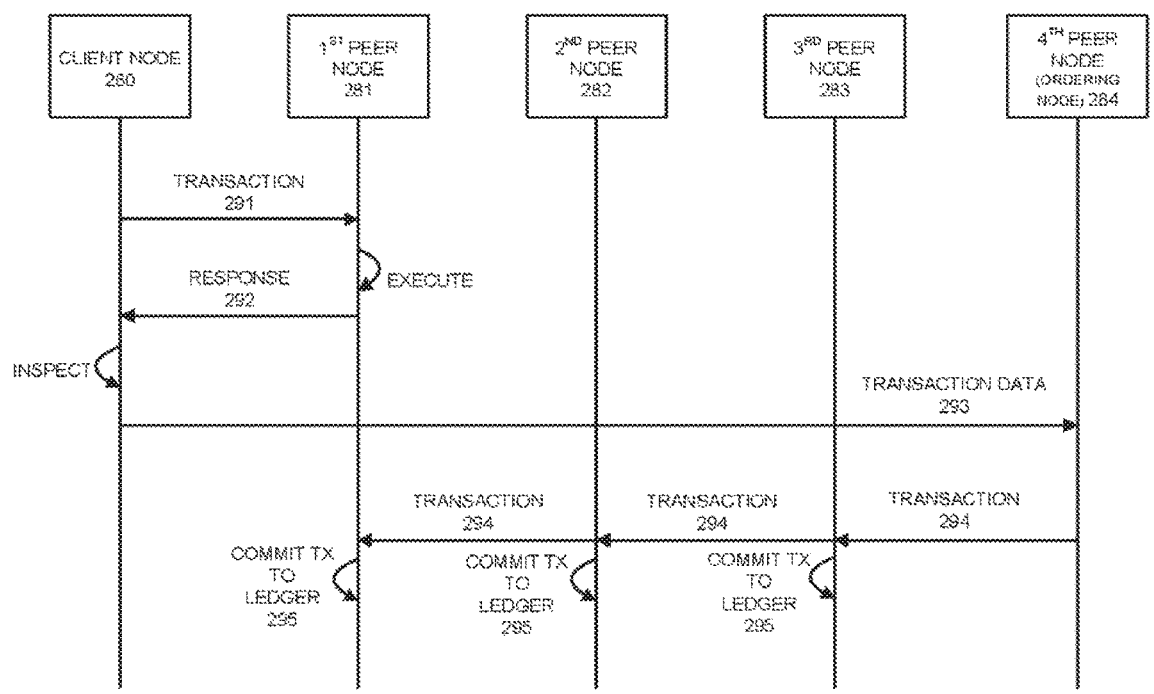
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
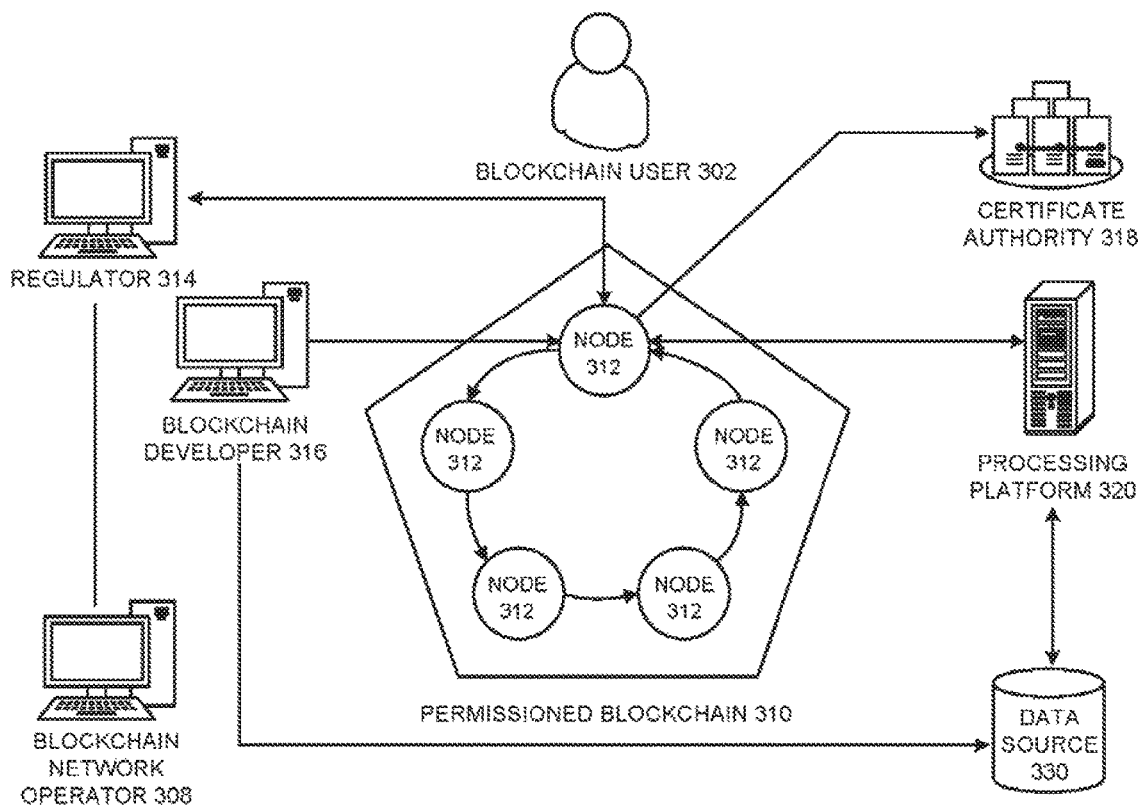
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manages peer permissions, such as enrolling the regulator system 310 as an "auditor" and the blockchain user 302 as a "client." An auditor could be restricted only to querying the ledger whereas a client could be authorized to deploy, invoke, and query certain types of chaincode.

In accordance with aspects of the present invention, a third party certificate authority, such as certificate authority 318 discussed above, would not be needed because the participants of an ad-hoc group who are authorized for the permissioned blockchain are stored along with their keys in a different blockchain. A system and method for creating and managing an ad-hoc group in accordance with aspects of the present invention may be used by other permissioned blockchain applications. For example, permissioned blockchain network 300, discussed above with reference to FIG. 3, may be modified in accordance with aspects of the present invention such that certificate authority 318 is replaced with another blockchain to retrieve information about the members of the ad-hoc group, such as their keys, their permission and their roles.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

The primary use case for a system and method for creating and managing an ad-hoc group in accordance with aspects of the present invention would be to add peers to the group in order to form a basic group. In order to add a peer, it must first be voted on by the current group. However, the prospective peer's information needs to be available for the vote to occur, so that the current group peers can review the information. A peer can follow the steps described hereafter in order to "invite" the prospective peer, thereby getting their information to present to the rest of group before the vote. Because this will be voted on by all group peers, there is no need for validation of the new peer with a third-party. A non-limiting example invitation sequence in accordance with aspects of the present invention will now be described with reference to FIGS. 4A-B.

Figure 4A:
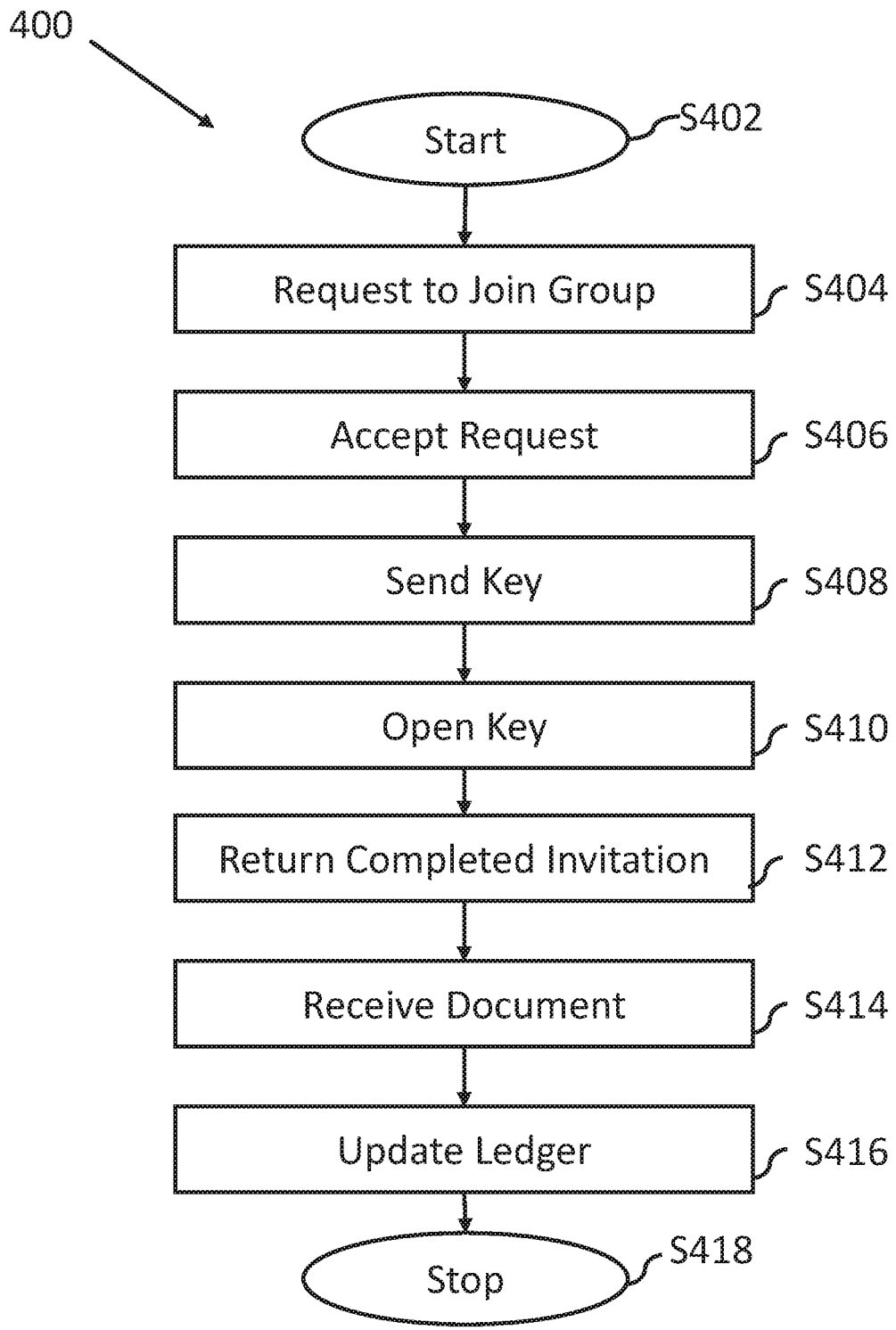
FIG. 4A illustrates a non-limiting example invitation sequence in accordance with aspects of the present invention, as flowchart.
Figure 4B:
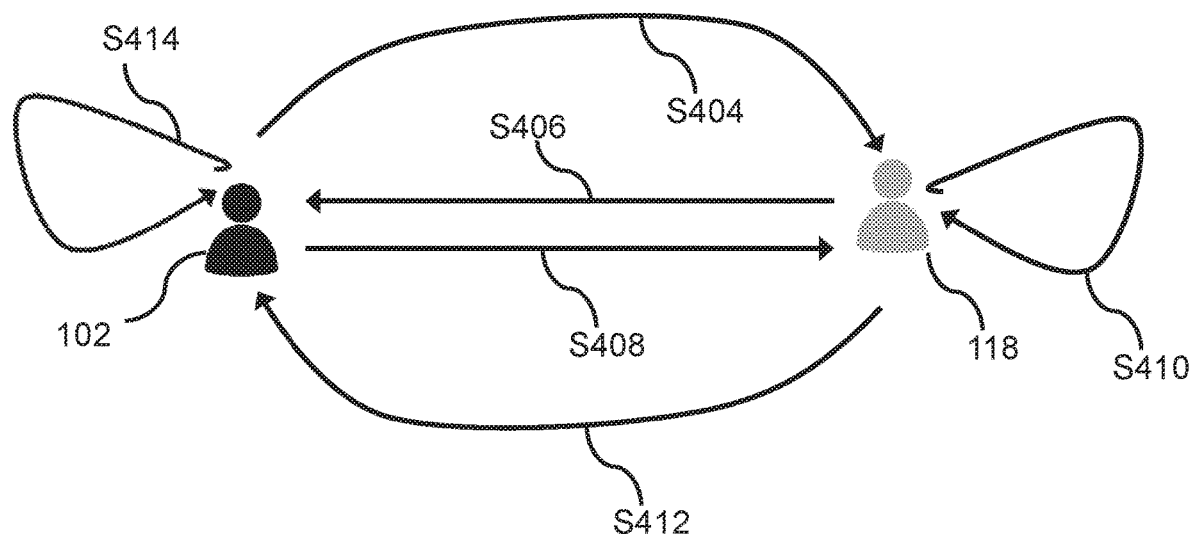
FIG. 4B illustrates the non-limiting example invitation sequence of FIG. 4B, schematically.

FIG. 4A illustrates a method 400 as flowchart, whereas FIG. 4B illustrates method 400 schematically. For purposes of discussion, in this example embodiment, as discussed above with reference to FIG. 1D, peer 102 invites a person 118 to join ad-hoc group 100.

In an example embodiment, the method of FIGS. 4A-B utilizes a JSON document, which for purposes of discussion in this example will be referred to as an invitation JSON.

As shown in FIG. 4A, method 400 starts and a peer asks a person to join the ad-hoc group (S404). In this example, peer 102 would request person 118. Person 118 would then accept the request (S406). For example, as shown in FIG. 4B, person 118 accepts the request from peer 102, and sends a public key back to peer 102 as shown by arrow 406 (S408). Only the user information of person 118 is present in the JSON document since peer 102 should only need the public key provided by peer 118 and no other user information would need to be exchanged with peer 102.

Returning to FIG. 4A, the invitation is then opened (S410). Person 118 then decrypts the JSON document using their private key in accordance with conventional PKI protocols. Peer 102 will have added their information to the invitation JSON document for person 118 to process and present to the group. Person 118 then adds their information, e.g., name, contact information, IP address, etc., to the JSON document. For adding a multiplicity of users, the process would require multiple iterations through the invitation and voting process. The iterations would be equal to the number of users to be added.

Person 118 then encrypts the now filled out invitation JSON document with the public key and sends it back to peer 102, to be presented to the entire ad-hoc group (S412). Peer 102 then decrypts the filled out invitation JSON document with their private key to retrieve the filled out invitation JSON document (S414).

Once the information for the prospective peer, in this example person 118, is available, the ad-hoc group can vote on whether or not they want to add the prospective peer, in this example peer 118, as new peer. As discussed earlier, in a non-limiting example embodiment, current peers may vote "yes" by digitally signing the group document, and any votes not cast via signatures upon timeout are considered "no" votes. This may continue until either the specified number of votes or timeout is reached.

Based on the outcome of the vote, information of the prospective peer, in this example peer 118, will either be added to the group JSON document and all policies updated to reflect the new peer count, or the information will simply be disregarded as invalid (S416). Chaincode/smart contracts will enforce the guidelines and policies on how peers are added and removed. If the prospective peer is added to the group, and depending on which previously discussed method was used to maintain the document, they will be sent the document's uuid or txid so that peers of the group can access it. At this point, method 400 stops (S418).

While the above-discussed non-limiting example fully describes the process of adding a new peer, the processes of voting on the other policies would work in much the same way. A peer would first motion to remove a peer, leave the group themselves, or update their own information, and the group would then vote on it. Additionally, group peers should be able to take advantage of this voting process to alter current policies or define their own. For example, peers may want to change the number of votes needed or timeout for a certain policy, or create a policy for handling topics entirely different from group management.

Figure 5:
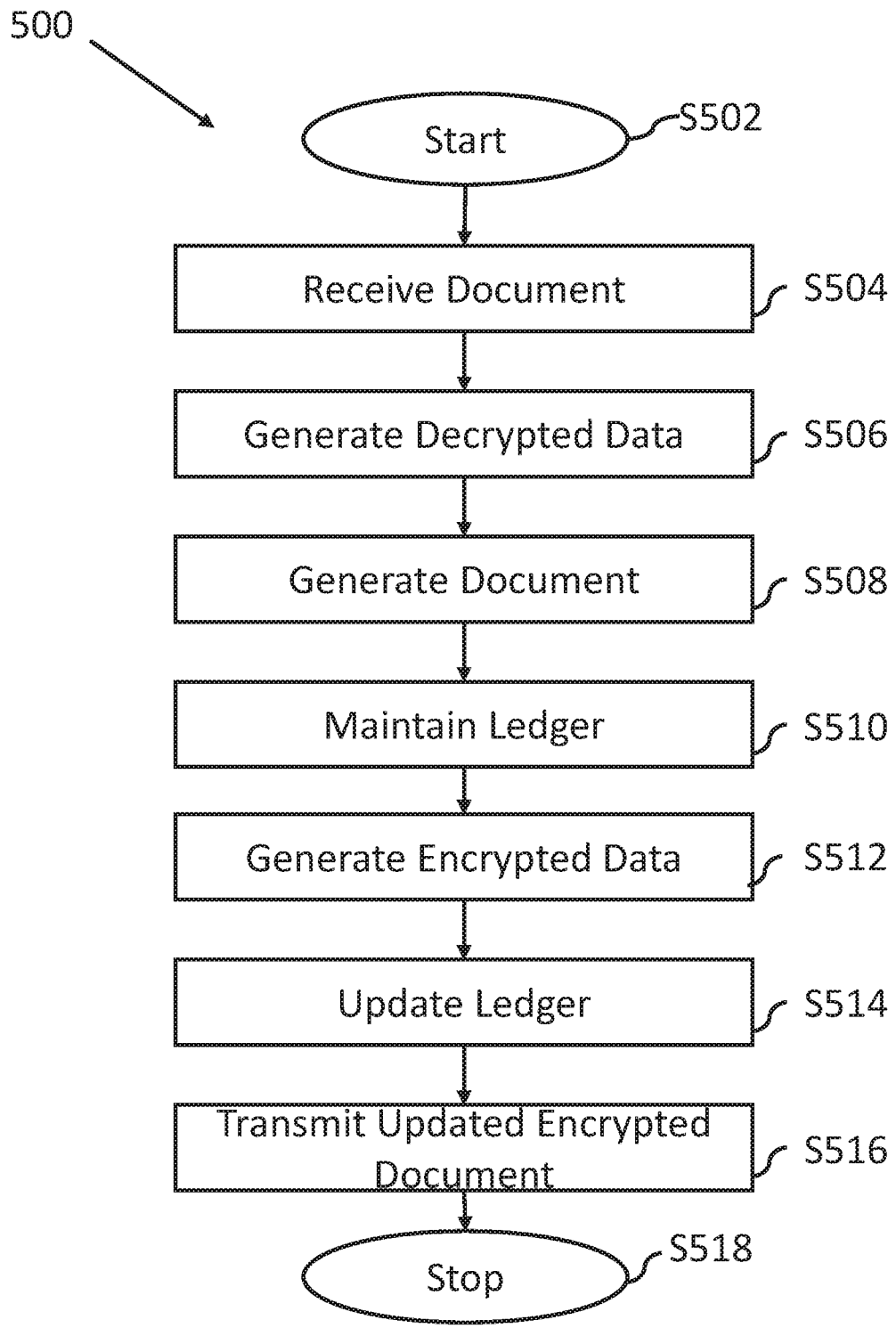
FIG. 5 illustrates an example method of managing an ad-hoc group in accordance with aspects of the present invention.

FIG. 5 illustrates a method 500 of securely managing an ad-hoc group in accordance with aspects of the present invention.

As shown in the figure, method 500 starts (S502) and an encrypted document is received (S504). For purposes of discussion, in this example a JSON document, which outlines the policies of ad-hoc group creation, ad-hoc group modification, peer roles, peer information and peer data access privileges additionally includes new changes proposed by peer 104 to a software product during agile development. In other words, the JSON document in this example includes attributes that may be included in other documents to form and manage an ad-hoc group in accordance with aspects of the present invention, but also includes a data associated with product development to be shared between a team of developers, who in this case are peers 102, 104, 106 and 108.

In this example, let peer 104 provide the JSON document to each of peers 102, 106 and 108.

Returning to FIG. 5, after the encrypted document is received (S504), decrypted data is generated (S506). In an example embodiment, method 500 includes decrypting, via a processing unit, for example within the physical infrastructure of the cryptographic trust services 218, the encrypted JSON document to generate the decrypted JSON document.

Returning to FIG. 5, after the decrypted data is generated (S506), the document generated (S508). In an example embodiment, method 500 includes modifying, via a processing unit within application code 220, the JSON document. As discussed above, the JSON document may be modified to include members, remove members, changes policies, read or edit data, etc.

Returning to FIG. 5, after the document is generated (S508), the ledger is maintained (S510). In an example embodiment, method 500 includes maintaining, via a memory, the cryptographic distributed ledger based on the decrypted data and the modified data. For example, returning to FIG. 2A, blockchain platform 212 maintains the cryptographic ledger and maintains the history of the data within the JSON document.

Returning to FIG. 5, after the ledger is maintained (S510), encrypted data is generated (S512). In an example embodiment, method 500 includes encrypting, via the processing unit, the JSON document. In this manner, the JSON document remains secure from those not within the ad-hoc group.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Returning to FIG. 5, after the encrypted data is generated (S512), the ledger is updated (S514). In an example embodiment, method 500 includes updating, via the memory, the cryptographic distributed ledger based on the encrypted data.

After the ledger is updated (S514), an updated encrypted document is transmitted (S516). In an example embodiment, method 500 includes transmitting, via a known input/output interface, the encrypted JSON document to all members of the ad-hoc group. Non-limiting examples of known input/output interfaces include data media interfaces. In this manner, all members of the group continuously have an updated, secure copy of the JSON document.

Returning to FIG. 5, after the updated encrypted document is transmitted (S516), method 500 stops (S518).

Figure 6A:
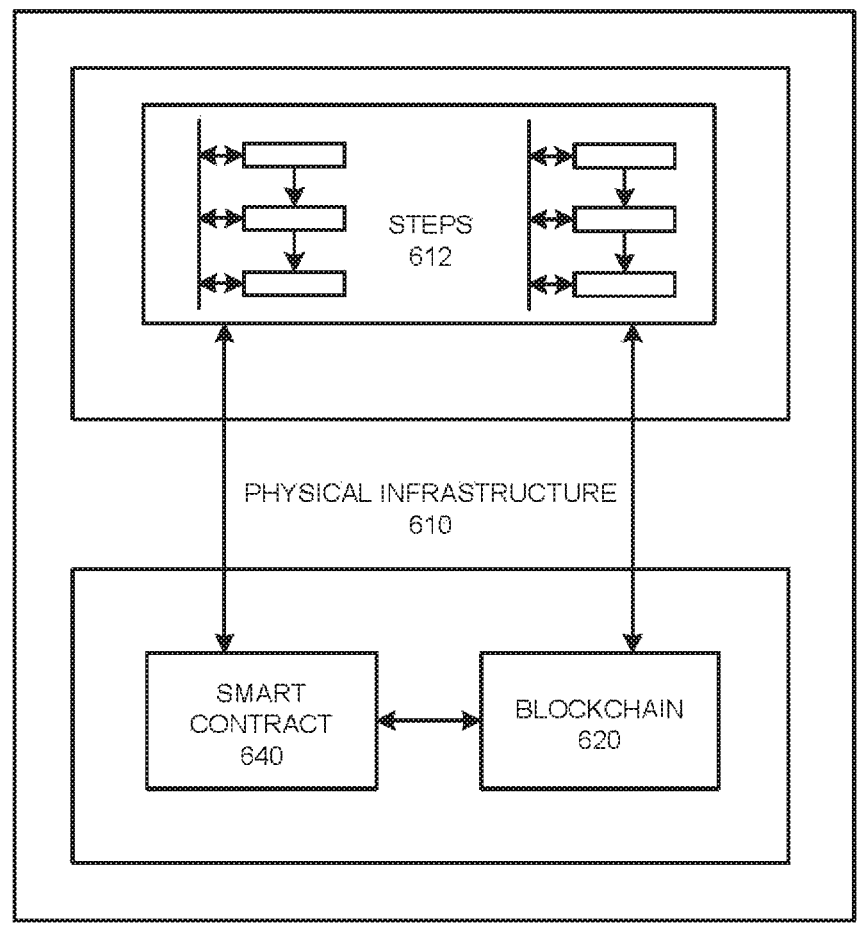
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
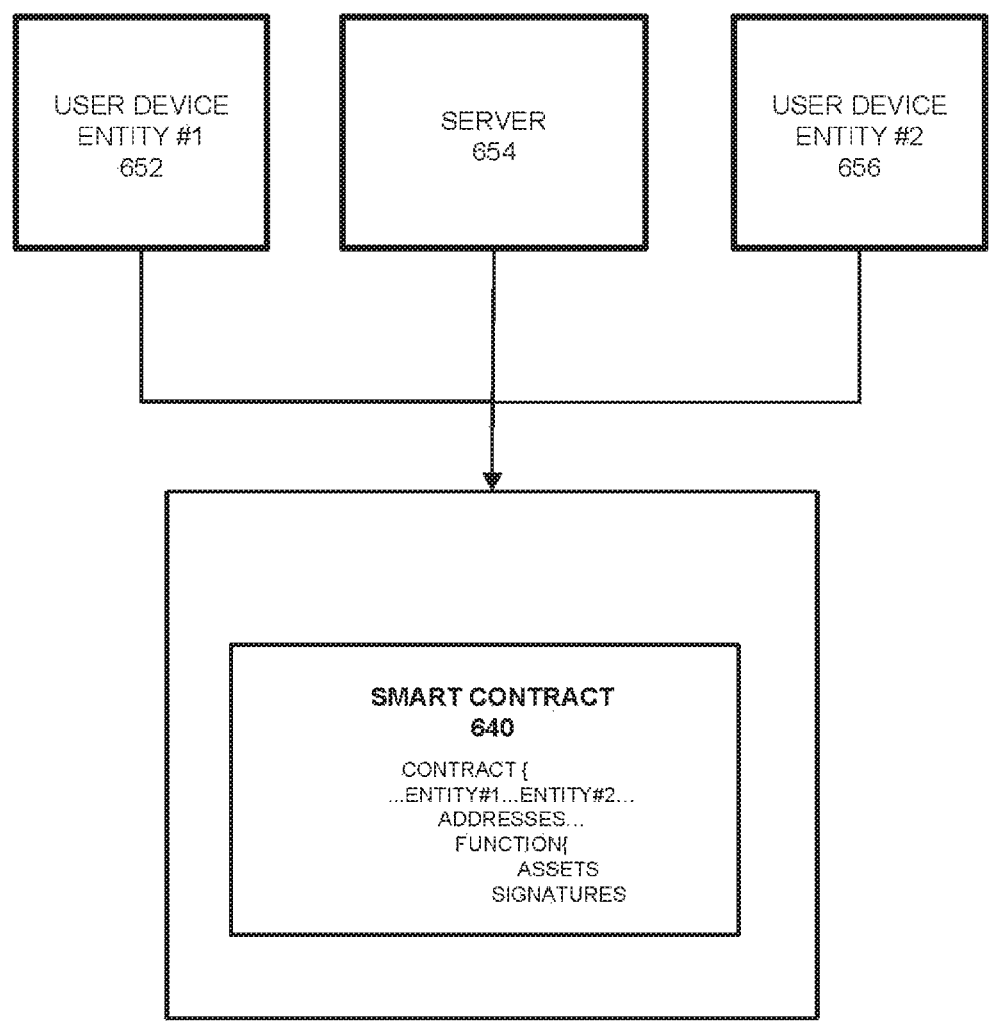
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
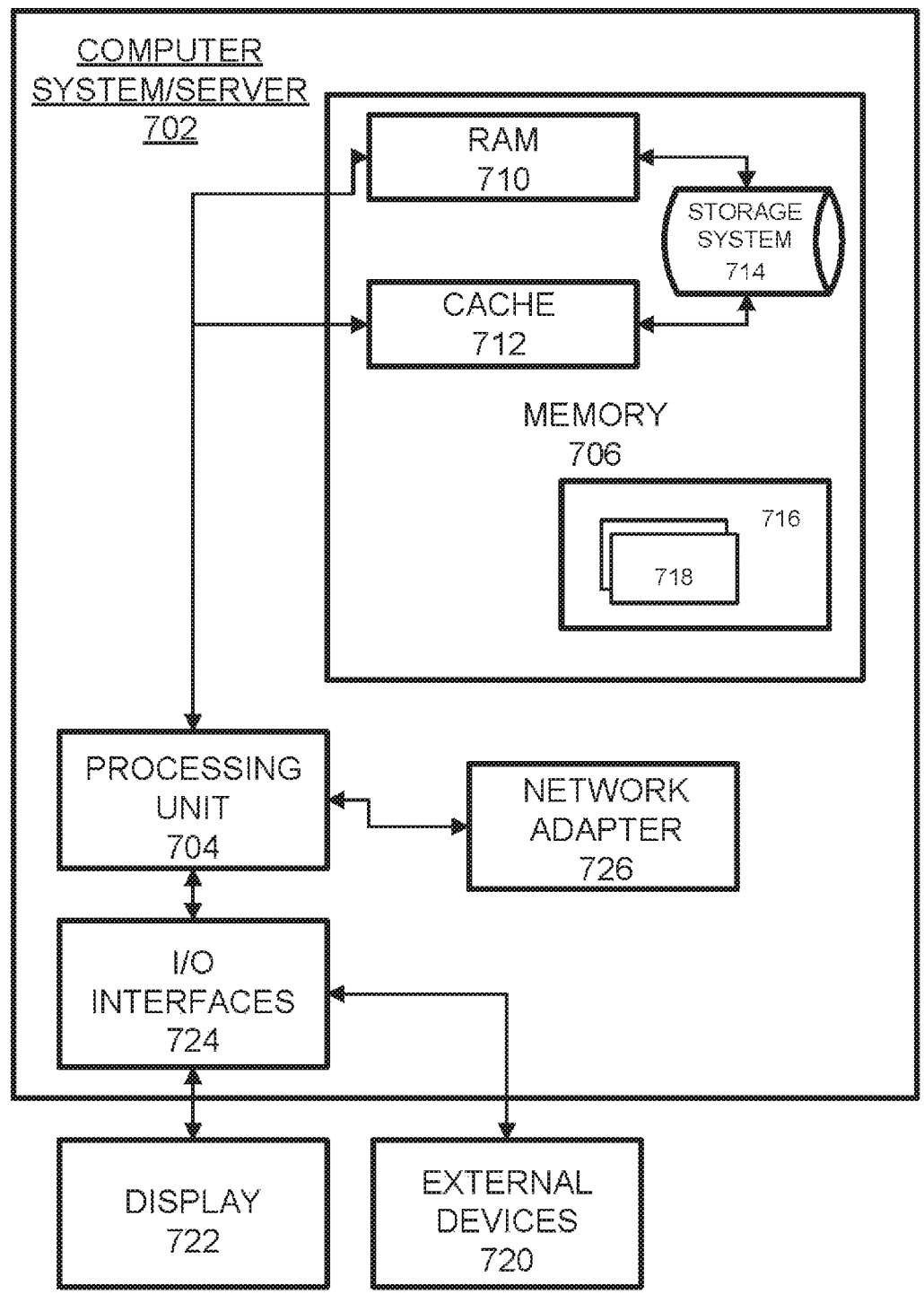
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, offthe-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   creating, via an input/output interface, a document that includes peer information of peers included in an ad-hoc group and which defines procedures to create the ad-hoc group having an original peer, to add a new peer to the ad-hoc group, and to remove of one or more of the original peer and the new peer;
   maintaining, via a memory, a cryptographic distributed ledger based on the document and peer data associated with the ad-hoc group;
   encrypting, via a processing unit, the document to create an encrypted document;
   encrypting, via the processing unit, the cryptographic distributed ledger to create an encrypted cryptographic distributed ledger;
   providing, via the input/output interface, the encrypted cryptographic distributed ledger to the ad-hoc group;
   decrypting, via the processing unit, the encrypted document to generate the document;
   adding the new peer to the ad-hoc group based on the procedure to add the new peer to the ad-hoc group that is defined in the document;
   modifying, via the processing unit, the document to create a modified document that includes peer information of the new peer;
   decrypting, via the processing unit, the encrypted cryptographic distributed ledger to generate the cryptographic distributed ledger;
   updating, via the memory, the cryptographic distributed ledger based on the modified document to create an updated cryptographic distributed ledger;
   encrypting, via the processing unit, the modified document to create an encrypted modified document;
   encrypting, via the processing unit, the updated cryptographic distributed ledger to create an encrypted updated cryptographic distributed ledger; and
   providing, via the input/output interface, the updated encrypted cryptographic distributed ledger to the ad-hoc group.

2. The method of claim 1, wherein said creating, via the input/output interface, the document comprises creating a JSON document.

3. The system of claim 1, wherein said modifying, via the processing unit, the document to create the modified document further comprises removing one or more of the original peer and the new peer.

4. The method of claim 1, wherein said creating, via the input/output interface, the document that defines procedures comprises creating the document that defines procedures additionally to replace information related to one or more of the original peer and the new peer.

5. A system comprising:
   an input/output interface operable to create a document that includes peer information of peers included in an ad-hoc group and which defines procedures to create the ad-hoc group having an original peer, to add a new peer to the ad-hoc group and to remove of one or more of the original peer and the new peer;
   a memory operable to maintain a cryptographic distributed ledger based on the document and peer data associated with the ad-hoc group; and
   a processing unit operable to encrypt the document to create an encrypted document, to encrypt the cryptographic distributed ledger to create an encrypted cryptographic distributed ledger,
   wherein the input/output interface is further operable to provide the encrypted cryptographic distributed ledger to the ad-hoc group;
   wherein the processing unit is further operable to decrypt the encrypted document to generate the document, to add the new peer to the ad-hoc group based on the procedure to add the new peer to the ad-hoc group that is defined in the document, modify the document to create a modified document that includes peer information of the new peer, and to decrypt the encrypted cryptographic distributed ledger to generate the cryptographic distributed ledger, wherein the memory is further operable to update the cryptographic distributed ledger based on the modified document to create an updated cryptographic distributed ledger, wherein the processing unit is further operable to encrypt the modified document to create an encrypted modified document and to encrypt the updated cryptographic distributed ledger to create an encrypted updated cryptographic distributed ledger, and wherein the input/output interface is further operable to provide the updated encrypted cryptographic distributed ledger to the ad-hoc group.

6. The system of claim 5, wherein said input/output interface is operable to create the document as a JSON document.

7. The system of claim 5, wherein processing unit is further operable to modify the document to create the modified document by removing one or more of the original peer and the new peer.

8. The system of claim 5, wherein said input/output interface is further operable to create the document that defines procedures additionally to replace information related to one or more of the original peer and the new peer.

9. A non-transitory computer readable medium comprising instructions, that when read by a processor, cause the processor to perform the method comprising:

creating, via an input/output interface, a document that includes peer information of peers included in an ad-hoc group and which defines procedures to create the ad-hoc group having an original peer, to add a new peer to the ad-hoc group and to remove of one or more of the original peer and the new peer;

maintaining, via a memory, a cryptographic distributed ledger based on the document and peer data associated with the ad-hoc group;

encrypting, via a processing unit, the document to create an encrypted document;

encrypting, via the processing unit, the cryptographic distributed ledger to create an encrypted cryptographic distributed ledger;

providing, via the input/output interface, the encrypted cryptographic distributed ledger to the ad-hoc group;

decrypting, via the processing unit, the encrypted document to generate the document;

adding the new peer to the ad-hoc group based on the procedure to add the new peer to the ad-hoc group that is defined in the document;

modifying, via the processing unit, the document to create a modified document that includes peer information of the new peer;

decrypting, via the processing unit, the encrypted cryptographic distributed ledger to generate the cryptographic distributed ledger;

updating, via the memory, the cryptographic distributed ledger based on the modified document to create an updated cryptographic distributed ledger;

encrypting, via the processing unit, the modified document to create an encrypted modified document;

encrypting, via the processing unit, the updated cryptographic distributed ledger to create an encrypted updated cryptographic distributed ledger; and providing, via the input/output interface, the updated encrypted cryptographic distributed ledger to the ad-hoc group.

10. The non-transitory computer readable medium of claim 9 comprising instructions, that when read by a processor, cause the processor to perform the method wherein said creating, via the input/output interface, the document comprises creating a JSON document.

11. The non-transitory computer readable medium of claim 10 comprising instructions, that when read by a processor, cause the processor to perform the method wherein said modifying, via the processing unit, the document to create the modified document further comprises removing one or more of the original peer and the new peer.

12. The non-transitory computer readable medium of claim 9 comprising instructions, that when read by a processor, cause the processor to perform the method wherein said creating, via the input/output interface, the document that defines procedures further comprises creating the document that defines procedures additionally to replace information related to one or more of the original peer and the new peer.

* * * * *